United States Patent Office.

ELI WILLS, OF WINSLOW, NEW JERSEY, ASSIGNOR TO HIMSELF AND CHARLES P. WESTCOTT, OF SAME PLACE.

Letters Patent No. 95,298, dated September 28, 1869; antedated September 13, 1869.

IMPROVED MEDICAL COMPOUND.

The Schedule referred to in these Letters Patent and making part of the same.

To all whom it may concern:

Be it known that I, ELI WILLS, of Winslow, in the county of Camden, and State of New Jersey, have invented a new and improved Medical Compound; and I do hereby declare that the following is a full, clear, and exact description thereof, which will enable others skilled in the art to make and use the same.

This invention relates to a new medical compound, to be used for curing dyspepsia and other like diseases; and consists in the application of the root of the starwort or helonias-plant for that purpose.

The medicine is prepared by boiling about four ounces of root in three gallons of water, until one gallon of water has been evaporated, and in adding one-half ounce of alcohol to every pint of the mixture.

The root, before being boiled, is cut up in fine pieces or reduced to a fine powder.

The medicine is to be taken before the meals on an empty stomach, three times a day, each dose being one table-spoonful.

The helonias is found in swampy ground, and abounds in New Jersey, Pennsylvania, and Virginia.

Having thus described my invention,

I claim as new, and desire to secure by Letters Patent—

The medical compound herein described.

The above specification of my invention signed by me, this 18th day of February, 1869.

his
          ELI X WILLS.
            mark.

Witnesses:
 FRANK BLOCKLEY,
 C. L. TOPLIFF.